United States Patent
Tewari et al.

(10) Patent No.: US 12,430,228 B2
(45) Date of Patent: Sep. 30, 2025

(54) DETERMINING NON-FUNCTIONAL REQUIREMENTS (NFR) FROM A RUN TIME ENVIRONMENT AND INCORPORATING INTO A DEVELOPMENT CYCLE

(71) Applicant: International Business Machines Corporation, Armonk, NY (US)

(72) Inventors: Nitin Tewari, Ghaziabad (IN); Mayank Sharma, Bangalore (IN); Vinay Nair, Hyderabad (IN); Aditi Bhattacharya, Kolkata (IN); Sandeep Dixit, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 18/227,441

(22) Filed: Jul. 28, 2023

(65) Prior Publication Data
US 2025/0036548 A1 Jan. 30, 2025

(51) Int. Cl.
*G06F 11/3604* (2025.01)
*G06F 11/3668* (2025.01)

(52) U.S. Cl.
CPC ...... *G06F 11/3612* (2013.01); *G06F 11/3676* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 7,490,319 B2 | 2/2009 | Blackwell et al. | |
| 9,208,062 B1* | 12/2015 | Arguelles | G06F 11/3692 |
| 9,286,188 B1 | 3/2016 | Chopra et al. | |
| 9,559,928 B1* | 1/2017 | Porter | G06F 11/3624 |
| 10,545,855 B1* | 1/2020 | Jayaswal | G06F 11/34 |

(Continued)

OTHER PUBLICATIONS

S. Pramanik, D. Taylor and B. Wong, "Towards an Efficient Online Causal-Event-Pattern-Matching Framework," 2013 IEEE 33rd International Conference on Distributed Computing Systems, Philadelphia, PA, USA, 2013, pp. 481-490. (Year: 2013).*

(Continued)

*Primary Examiner* — Andrew M. Lyons
(74) *Attorney, Agent, or Firm* — Zilka-Kotab, P.C.

(57) ABSTRACT

A computer-implemented method, according to one embodiment, includes analyzing application details associated with a plurality of different timestamp intervals, in response to a determination, from results of analyzing runtime information associated with an application failure event and/or sub-par runtime performance that occurs during a first operational run cycle of an application, that the failure event and/or sub-par runtime performance is caused by a Non-Functional Requirement (NFR) issue. In response to a determination that a first of the timestamp intervals falls within a timestamp associated with the application failure event and/or sub-par runtime performance, first pattern information about the application details associated with the first timestamp interval is collected. The method further includes applying the first pattern information to a weight-age algorithm. In response to a determination that test coverage gaps exist in a predetermined collection of test cases, test cases are created based on the first pattern information.

20 Claims, 13 Drawing Sheets

(56) References Cited

U.S. PATENT DOCUMENTS

| | | | | |
|---|---|---|---|---|
| 11,544,656 | B1* | 1/2023 | Manzano | G06F 11/3692 |
| 2006/0174222 | A1 | 8/2006 | Thonse et al. | |
| 2009/0300587 | A1* | 12/2009 | Zheng | G06F 11/3676 |
| | | | | 717/127 |
| 2016/0162386 | A1* | 6/2016 | Sivanesan | G06F 11/3684 |
| | | | | 717/124 |
| 2016/0259714 | A1* | 9/2016 | Shor | G06F 11/3616 |
| 2017/0235662 | A1* | 8/2017 | Leask | G06Q 10/00 |
| | | | | 717/125 |
| 2021/0056009 | A1* | 2/2021 | Gal | G06F 11/3676 |
| 2023/0325303 | A1* | 10/2023 | Jebbar | G06F 11/3684 |
| | | | | 717/124 |
| 2024/0378137 | A1* | 11/2024 | Frickenstein | G06N 3/044 |

OTHER PUBLICATIONS

Kassab et al., "Early Quantitative Assessment of Non-Functional Requirements," ACM SIGOPS Operating Systems Review, Jan. 2007, 15 pages.

Cleland-Huang et al., "Goal-Centric Traceability for Managing Non-Functional Requirements," ICSE, 2005, pp. 362-371.

Splunk, "Use case: Examine upstream and downstream dependencies for a service update," Splunk, Observability, 2023, 3 pages, retrieved from https://docs.splunk.com/Observability/infrastructure/network-explorer/network-explorer-use-cases/examine-service-dependencies.html on May 22, 2023.

NASA, "Design and Integration Tools Failure Modes and Effects Analysis Tool (FMEA) (MSC-25379-1)," NASA Technology Transfer Program, Nasa Software Catalog, 2023, 3 pages, retrieved from https://software.nasa.gov/software/MSC-25379-1.

Filieri et al., "A Formal Approach to Adaptive Software: Continuous Assurance of Non-Functional Requirements," Formal Aspects of Computing, Nov. 2011, pp. 1-24, retrieved from https://core.ac.uk/download/pdf/77013453.pdf.

Almeida et al., "Dynamic Decision-Making based on NFR for Managing Software Variability and Configuration Selection," preprint, Proceedings of the 30th Annual ACM Symposium on Applied Computing, Apr. 13, 2015, 7 pages, https://dl.acm.org/doi/10.1145/2695664.2695875.

Wikipedia, "DevOps," Wikipedia, 2023, 7 pages, retrieved from https://en.wikipedia.org/wiki/DevOps.

\* cited by examiner

| Stages | Normal runtime operation scenario (scenario 1) | Exceptional runtime operation scenario (scenario 2) |
|---|---|---|
| Development stage- developers developed code based on provided requirements | Select * from table1 where name= "ABC" | Select * from table1 where name= "ABC" |
| Operational stage | 1. Returning 100 rows<br>2. Indexing is helping for optimized I/O operations and code finished in 5 minutes | 1. Code run returning large amount of data (assumed 1 million rows)<br>2. Indexing is creating performance issue due to additional page read and then data page read |
| Post NFR collection analysis | NFR- I/O is not an issue, indexing is working fine/working as designed | NFR- Indexing is creating the problem due to large data return during actual run. It is not working as designed |
| Input to development stage | No issue, code worked as developed | Issue noticed, indexing is creating problem for large dataset result. Test case to be run for larger database. |
| Test case suggestion | No suggestion | Id dataset is big then drop the index and let code run with tablespace scan. Verify by running the test case and analyze the result. |
| Futuristic suggestion | Add new template to test the code with large datasets | Add new template to test the code with large dataset |

FIG. 5

DETERMINING NON-FUNCTIONAL REQUIREMENTS (NFR) FROM A RUN TIME ENVIRONMENT AND INCORPORATING INTO A DEVELOPMENT CYCLE

BACKGROUND

The present invention relates to software development, and more specifically, this invention proposes a framework to uncover non-functional requirements (NFRs) from monitoring of a dynamic runtime environment and identify a downstream effect of changes by leveraging a learning-based model to continuously optimize a DevOps environment.

DevOps is a methodology in the software development and information technology (IT) industry. DevOps is often used as a set of practices and tools, and integrates and automates the work of software development (Dev) and IT operations (Ops).

DevOps is used for relatively improving and shortening the systems development life cycle. For example, a development process for a given application is a completely isolated process in that the impact that an update created during a development process will have in a DevOps environment is unknown during the development process. During use of an application in a production environment such as the DevOps environment, issues may be experienced that impact performance of the DevOps environment. For example, during an operational run cycle of an application in a predetermined mainframe DevOps production environment, a failure event and/or a sub-par runtime performance may be experienced. Analysis of these issues may be used to create a subsequent update, e.g., a software update, that is incorporated into a subsequent operational run cycle of the application to mitigate these issues.

SUMMARY

A computer-implemented method, according to one embodiment, includes analyzing application details associated with a plurality of different timestamp intervals, in response to a determination, from results of analyzing runtime information associated with an application failure event and/or sub-par runtime performance that occurs during a first operational run cycle of an application, that the failure event and/or sub-par runtime performance is caused by a Non-Functional Requirement (NFR) issue. In response to a determination that a first of the timestamp intervals falls within a predetermined timestamp associated with the application failure event and/or sub-par runtime performance, first pattern information about the application details associated with the first timestamp interval is collected. The method further includes applying the first pattern information to a predetermined weightage algorithm. In response to a determination, based on an output of the predetermined weightage algorithm, that test coverage gaps exist in a predetermined collection of test cases, test cases are caused to be created based on the first pattern information for mitigating the NFR issue during a subsequent operational run cycle of the application.

A computer program product, according to another embodiment, includes a computer readable storage medium having program instructions embodied therewith, the program instructions are readable and/or executable by a computer to cause the computer to perform the foregoing method.

A system, according to another embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 5 is a table, in accordance with one embodiment of the present invention.

DETAILED DESCRIPTION

Figure 1:
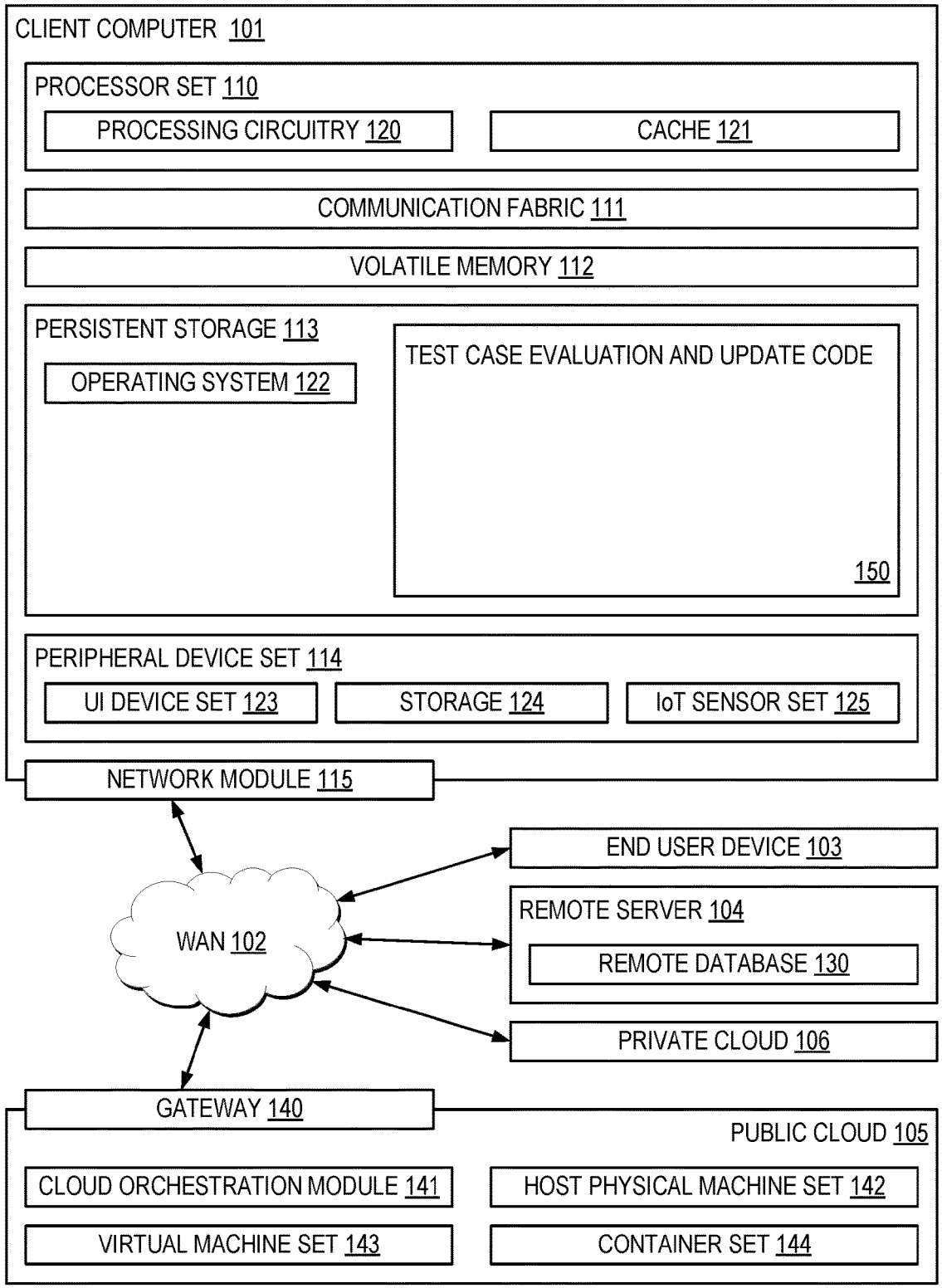
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for creating test cases based on gaps identified in a collection of test cases.

In one general embodiment, a computer-implemented method includes analyzing application details associated with a plurality of different timestamp intervals, in response to a determination, from results of analyzing runtime information associated with an application failure event and/or sub-par runtime performance that occurs during a first operational run cycle of an application, that the failure event and/or sub-par runtime performance is caused by a Non-Functional Requirement (NFR) issue. In response to a determination that a first of the timestamp intervals falls within a predetermined timestamp associated with the application failure event and/or sub-par runtime performance, first pattern information about the application details associated with the first timestamp interval is collected. The method further includes applying the first pattern information to a predetermined weightage algorithm. In response to a determination, based on an output of the predetermined weightage algorithm, that test coverage gaps exist in a predetermined collection of test cases, test cases are caused to be created based on the first pattern information for mitigating the NFR issue during a subsequent operational run cycle of the application.

In another general embodiment, a computer program product includes a computer readable storage medium having program instructions embodied therewith, the program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as test case evaluation and update code of block 150 for creating test cases based on gaps identified in a collection of test cases. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere herein, DevOps is a methodology in the software development and information technology (IT) industry. DevOps is often used as a set of practices and tools, and integrates and automates the work of software development (Dev) and IT operations (Ops).

DevOps is used for relatively improving and shortening the systems development life cycle. For example, a development process for a given application is a completely isolated process in that the impact that an update created during a development process will have in a DevOps environment is unknown during the development process. During use of an application in a production environment such as the DevOps environment, issues may be experienced that impact performance of the DevOps environment. For example, during an operational run cycle of an application in a predetermined mainframe DevOps production environment, a failure event and/or a sub-par runtime performance may be experienced. Analysis of these issues may be used to create a subsequent update, e.g., a software update, that is incorporated into a subsequent operational run cycle of the application to mitigate these issues.

The issues described above present problems within conventional DevOps environments as an estimated 40% of mainframe developers struggle with processes like building a continuous integration/continuous deployment (CI/CD) pipeline, while an estimated 36% grapple with automated testing of mainframe applications. Furthermore, an estimated almost 60% of sampled respondents admit that when changes are made to the mainframe, they are not able to predict all the downstream effects to dependent applications and services. This puts critical applications at risk. One reason for this is because the production operational environment is completely isolated with the DevOps process.

In sharp contrast to the deficiencies of the conventional techniques described above, techniques described herein utilize infrastructure environment, application environment and runtime operational environment patterns that are relatively critical to the successful DevOps environment for developing a collection of test cases. The advantages of relative resilience, scale and speed may be realized by organizations that leverage these techniques for mainframe infrastructure by applying continuous improvement to the mainframe to make application development agile and responsive to the demands of the business. Along with infrastructure and application, the collection of dynamic environment patterns and impact on non-functional requirements (NFRs) are relatively very critical. Accordingly, using the novel techniques described herein for adopting DevOps practices and tooling based on the principles of integration and automation results in relatively accelerated application development and furthermore assists in coordinated work with web and mobile development teams.

One primary issue that the techniques described herein address is based on the principle that a continuous integration and continuous delivery/continuous deployment (CI/CD) pipeline may be a potential cause of failure and/or a sub-par runtime performance in production in the event that test case coverage does not identify all impacted areas. In order to address this issue, in some embodiments, the application environment is considered a relatively most important perspective from which to identify a downstream impact. Furthermore, an infrastructure environment may be a relatively critical perspective to review and identify a downstream impact. Yet furthermore, a runtime environment may provide a real time feel of the application code behavior. Accordingly, the runtime environment may be prudent to infuse as inputs for a DevOps cycle. For example, a database and/or table column size increase may lead to an increased tablespace size, which may result in a relatively longer run for a maintenance job, relatively higher memory usage and relatively higher CPU usage. This is NFR discovery and input may be infused for a future DevOps process using the techniques described herein, e.g., see method 200. As a result of monitoring the perspectives described above, the techniques described herein may be used to identify gaps in a current collection of test cases that are used to train a learning model that is used for operational run cycles of an application. These gaps may be identified by considering one or more predetermined parameters (preferably NFR parameters) such as, e.g., CPU usage, storage utilization, security, processing capacity, compatibility, reliability and availability, maintainability and manageability, recoverability and serviceability, scalability, and usability by collecting the data points from different logs such as: SYSLOG, an application log, a RACF2/ACF2 log, a transmission control protocol/internet protocol (TCP/IP) log, a SNMP log, SMF/RMF, etc. These techniques furthermore address the fact that within system testing, integration testing and performance testing, there is a need for different environmental pattern-based test coverage that considers time-based NFR, location based, workload-based functional requirement analysis.

Figure 2:
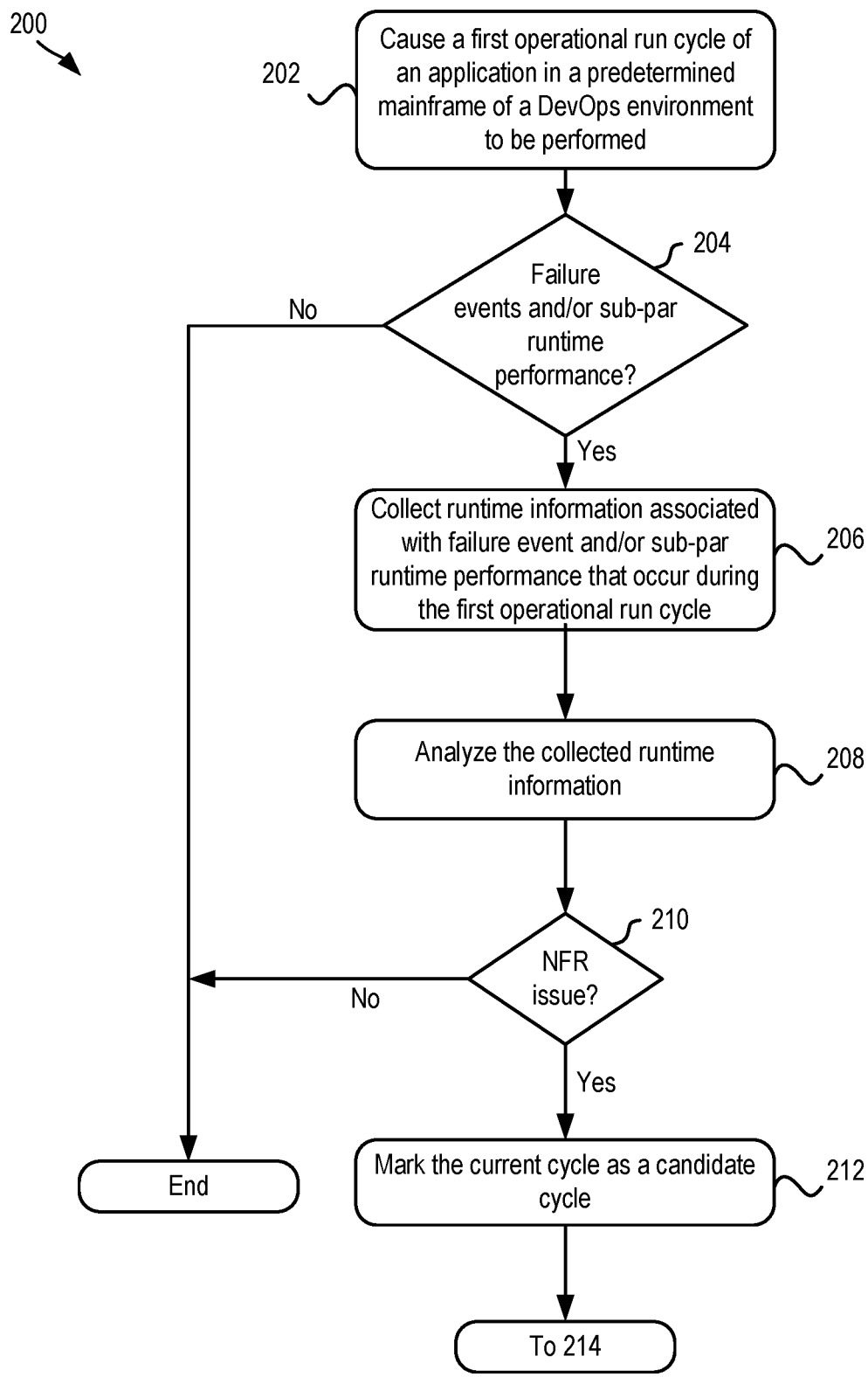
FIG. 2 is a flowchart of a method, in accordance with one embodiment of the present invention.
Figure 2:
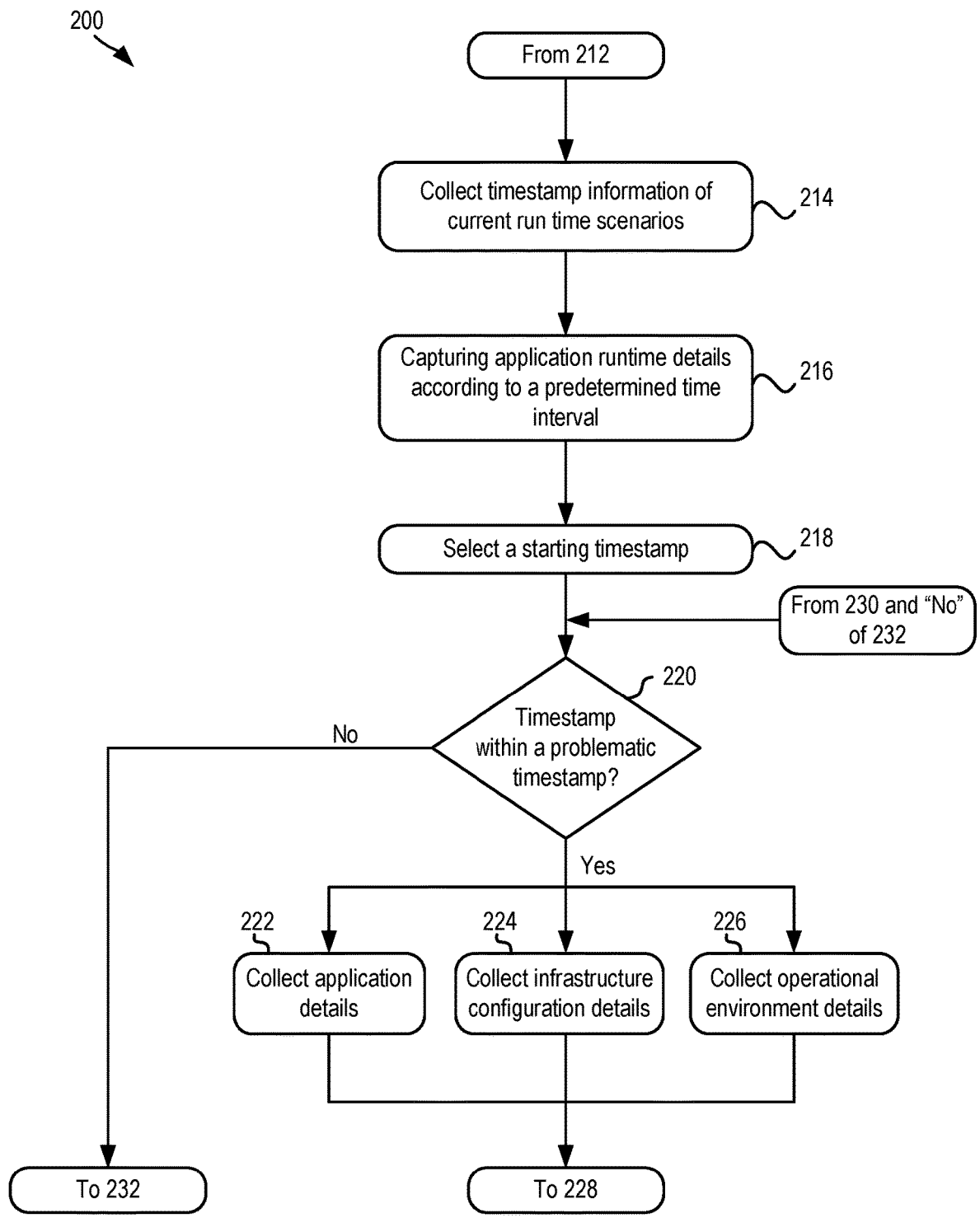
Figure 2:
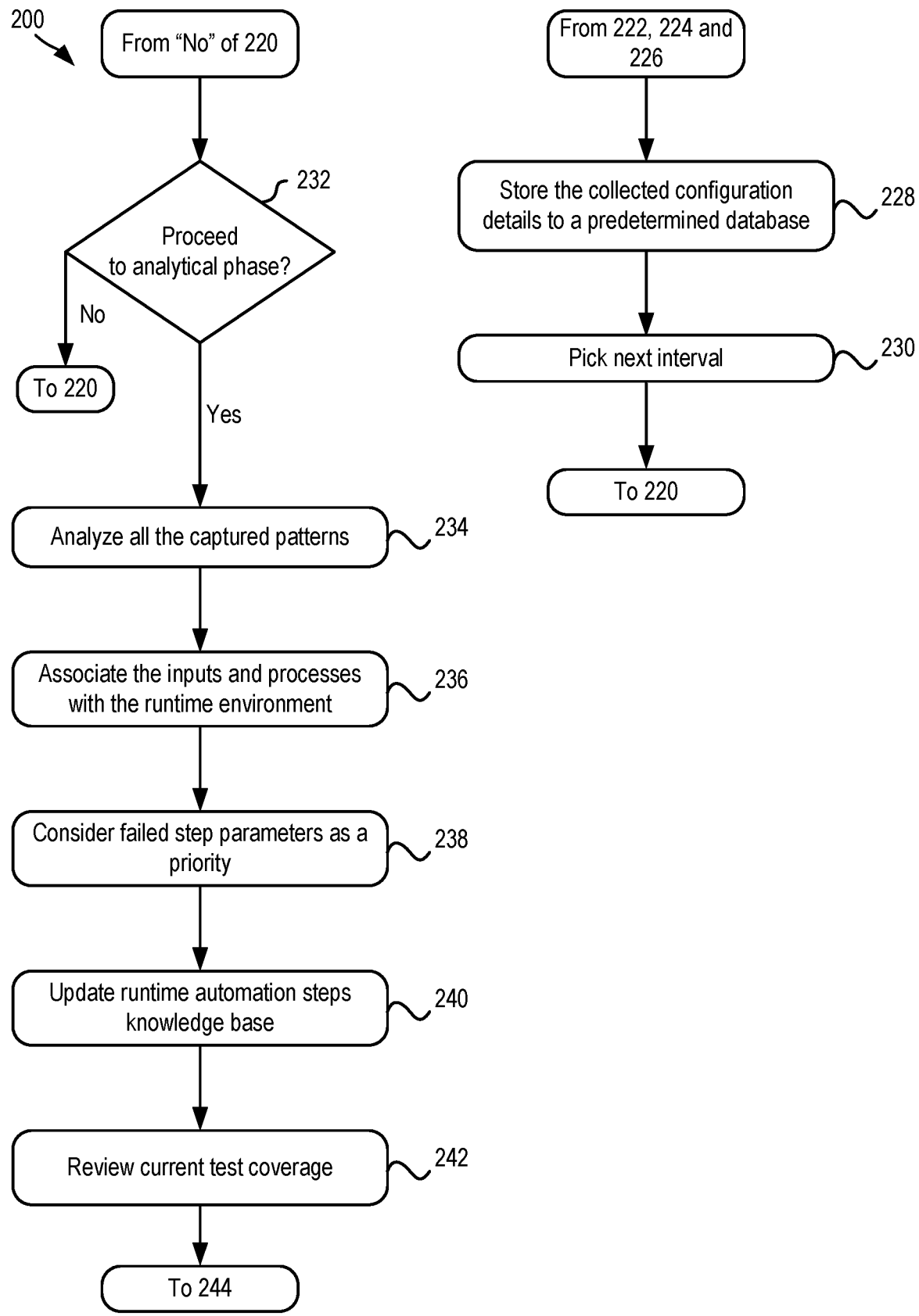
Figure 2:
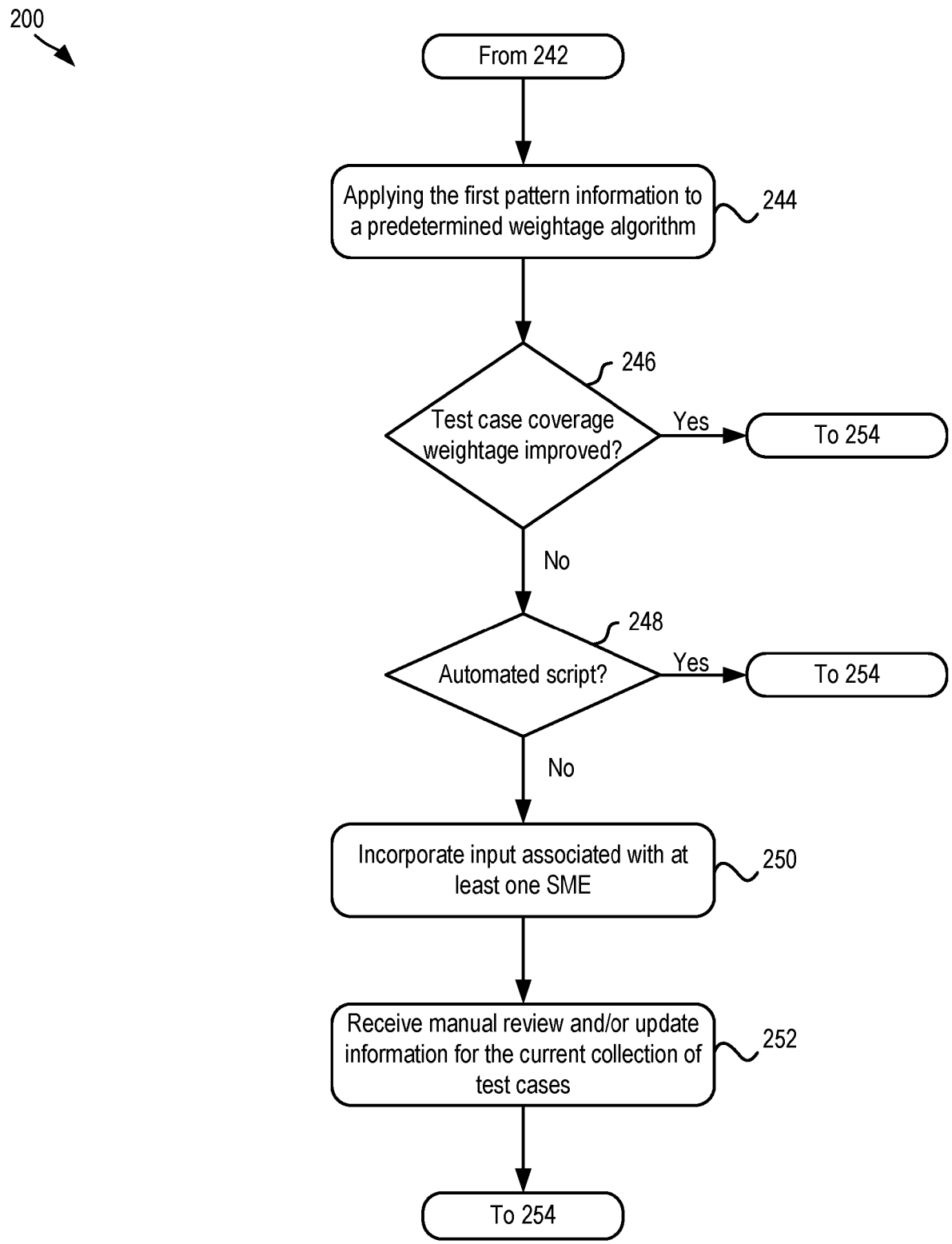
Figure 2:
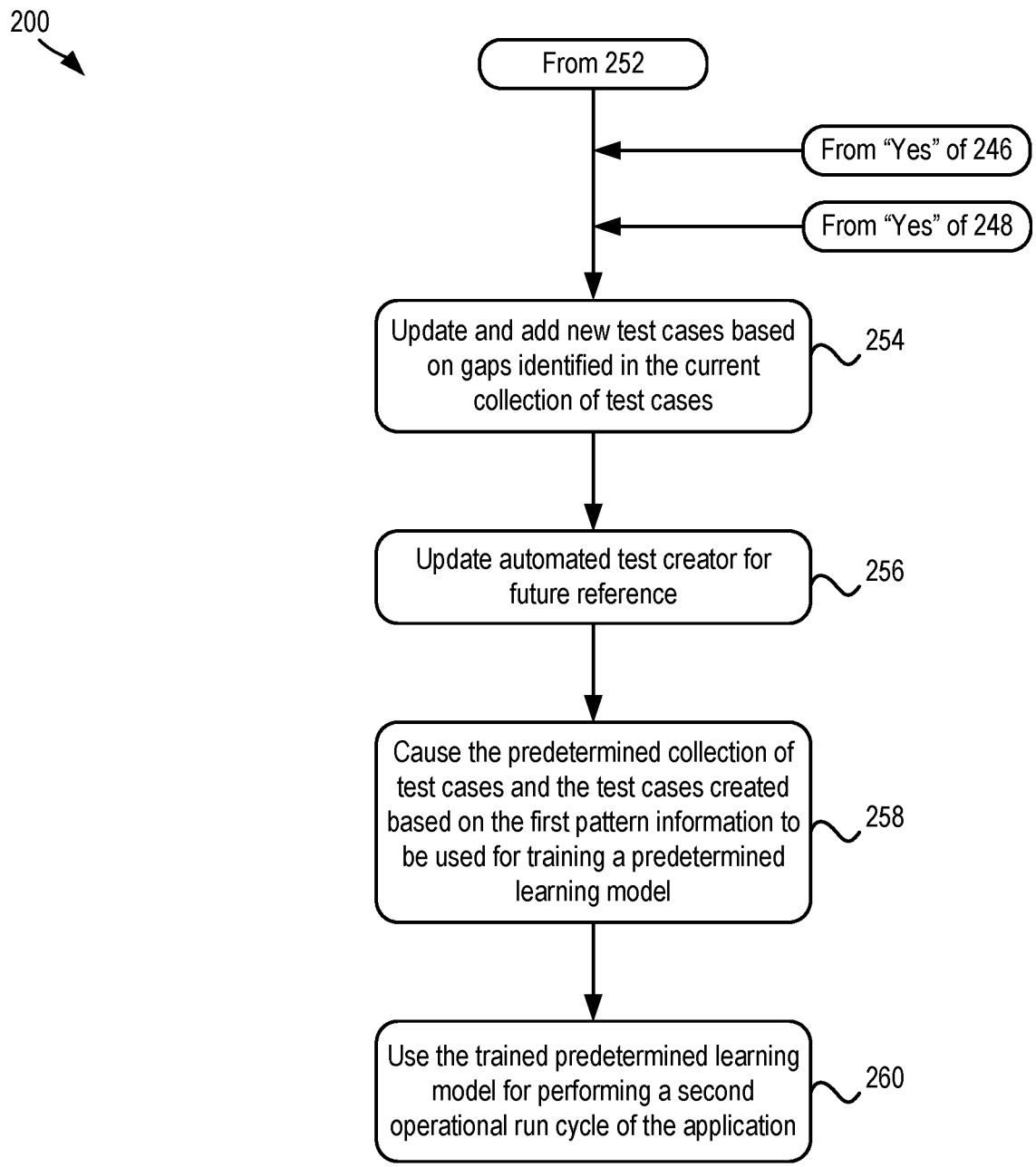

Now referring to FIG. 2, a flowchart of a method 200 is shown according to one embodiment. The method 200 may be performed in accordance with the present invention in any of the environments depicted in FIGS. 1-7, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

Operation 202 includes causing a first operational run cycle of an application in a predetermined mainframe DevOps environment to be performed. The application and DevOps environment may be of a type that would become apparent to one of ordinary skill in the art after reading the descriptions herein. In some approaches, the first operational run cycle of the application may be caused to be performed by sending, from a predetermined computer configured to perform the operations of method 200 to a predetermined controller of the mainframe, instructions to perform the first operational run cycle. It should be noted that the "first" operational run cycle of the application may, in some approaches, be an initial operational run cycle of the application, while in some other approaches, the first operational run cycle of the application may be a predetermined operational run cycle of the application. Furthermore, execution of the first operational run cycle may, in some approaches, begin as soon as a determination is made that the application is kick-started.

After initiating performance of the first operational run cycle of the application, a determination may be made as to whether any failure event(s) and/or sub-par runtime performance(s) have occurred, e.g., see decision 204. In some approaches, such a determination may be based on an identification of a predetermined condition, e.g., at least one predetermined performance metric falling below an associated threshold associated with an expected runtime performance, a predetermined type of anomaly being identified in runtime data, communication with the application at least temporarily failing, receiving a notification from a client device that an issue has occurred in a manufacturing environment, etc. In response to a determination that failure events and/or sub-par runtime performance(s) have not occurred during performance of the first operational run cycle of the application, e.g., as illustrated by the "No" logical path of decision 204, the method optionally ends and/or a subsequent operational run cycle of the application may be caused to be performed. For context, the method may optionally end because it may be determined that there is no need to collect further details to improve a current collection of test cases, e.g., a determination is made that no gaps exist in the current collection of test cases. In some approaches, the application is scheduled to run as a batch cycle in off-office hours in response to a determination that the failure events and/or sub-par runtime performance(s) have not occurred during performance of the first operational run cycle of the application. In some approaches, NFR data points are shared to a test case creator routine with an ultimate objective to facilitate a development cycle, e.g., a subsequent operational run cycle, to be fed with useful information.

A determination may be made that one or more failure events and/or sub-par runtime performance(s) have occurred during performance of the first operational run cycle of the application, e.g., as illustrated by the "Yes" logical path of decision 204. In some approaches, in response to a determination that one or more failure events and/or sub-par runtime performance(s) have occurred during performance of the first operational run cycle of the application, runtime information associated with the failure events and/or sub-par runtime performance(s) may be collected, e.g., see operation 206. In some approaches, the runtime information is NFR information. The runtime information may be of a type of information that would become apparent to one of ordinary skill in the art after reading the descriptions herein. In one use case based on e-commerce-based web applications, monitoring of NFR matrices may be performed during the first operational run cycle of the application, where the first operational run cycle of the application is a testing phase of the application. In one or more of such approaches, the runtime information may include, e.g., overall performance information, overall response time information, page load time information, user interface responsiveness information, etc.

The collected runtime information associated with an application failure event may be analyzed, e.g., see operation 208, to determine whether the failure event is caused by an NFR issue, e.g., see decision 210. This analysis may include using known troubleshooting techniques, e.g., known root cause analysis techniques, for determining whether runtime information is associated with hardware or instead associated with NFRs. For context, various approaches described herein specifically address NFR issues rather than otherwise addressing functional requirement issues, because learning models may not be able to benefit from enrichment of a test case that is used to train the learning model. For example, a hardware related issue that causes a failure event may not be able to be avoided as a result of enrichment of a current collection of test cases because the hardware related issue instead may be fixed by replacement of an associated problematic hardware component. Accordingly, in some approaches, in response to a determination that the failure event is not caused by an NFR issue, e.g., as illustrated by the "No" logical path of decision 210, the method optionally ends.

In response to a determination, from results of analyzing runtime information associated with an application failure event that occurs during a first operational run cycle of an application in a predetermined mainframe DevOps environment, that the failure event is caused by a Non-Functional Requirement (NFR) issue, e.g., as illustrated by the "Yes" logical path of decision 210, application details associated with a plurality of different timestamp intervals may be analyzed. In some preferred approaches, in order to perform an analysis of the different timestamp intervals of the first operational run cycle of the application, the first operational run cycle may optionally be marked as a candidate cycle, e.g., see operation 212. For context, marking an operational cycle as a "candidate cycle" may, in some approaches, include setting a predetermined flag that is associated with collecting and/or reviewing runtime information associated with the operational run cycle. This way, the runtime information is preserved for the analysis that is performed.

In order to analyze the application details associated with the plurality of different timestamp intervals, method 200 may additionally and/or alternatively include collecting timestamp information of current run time scenarios, e.g., see operation 214. The collected timestamp information may, in some approaches, be collected by auditing an event log to determine operations that are currently running and/or have been performed during the different timestamp intervals of the first operational run cycle. Based on determining the operations performed during the different timestamp intervals of the first operational run cycle, application runtime details may be captured according to predetermined time intervals, e.g., see operation 216. For example, for each of the different timestamp intervals, application runtime details of operations performed in the timestamp interval may be collected for the analysis. In some approaches, the application runtime details include, e.g., an operation being performed at the time the failure event occurs, downstream operations that are functionally dependent on an operation being performed at the time the failure event occurs, usage details of a predetermined CPU at the time the failure event occurs, etc.

Analyzing application details associated with the plurality of different timestamp intervals may additionally and/or alternatively include selecting one of the timestamps to analyze (a starting timestamp to analyze), e.g., see operation 218. In some approaches, the starting timestamp is the timestamp that occurred first, while in some other approaches, the starting timestamp is a randomly selected one of the timestamps, the timestamp that occurred last, etc. A determination is made as to whether the timestamp being analyzed occurred within a problematic timestamp, e.g., see decision 220. For context, the "problematic timestamp" may be a timestamp that at least one of the failure events and/or sub-par runtime performance(s) temporally overlaps with. The collected configuration details may be stored to a predetermined database, e.g., see operation 228. In one approach, the predetermined database includes a predetermined pattern capture routine (PCR) database. A next timestamp interval (if one exists) may be selected and considered, e.g., see operation 230.

In some approaches, method 200 additionally and/or alternatively includes analyzing the captured application runtime details to determine whether any of the identified operations occurred within the problematic timestamp. For context, an operation may be determined to have occurred within the problematic timestamp in response to a determination that at least a portion of the operation falls within the problematic timestamp. In response to a determination that the timestamp being analyzed does not fall within the problematic timestamp, e.g., as illustrated by the "No" logical path of decision 220, method 200 optionally continues to decision 232. In contrast, in response to a determination that the timestamp being analyzed falls within the predetermined timestamp associated with the application failure event, e.g., within the problematic timestamp as illustrated by the "Yes" logical path of decision 220, first pattern information about the application details associated with the first timestamp interval is collected, e.g., see operations 222, 224 and 226. In other words, comprehensive data points from application, infrastructure and an operational perspective may be captured. It may be noted that, in some approaches, the timestamp being analyzed falling within the predetermined timestamp associated with the application failure event may indicate that predetermined pattern information associated with the timestamp being analyzed is potentially lacking within test cases that are used for training a learning model that is used for running one or more operational run cycles of the application in the predetermined mainframe DevOps environment. In other words, because the failure event occurs within the timestamp being analyzed, information associated with the timestamp being analyzed may be used to potentially fill the gaps within training data that at least in part may have caused the failure event to occur.

Operations 222, 224 and 226 include collecting application details, collecting infrastructure configuration details, and collecting operational environment details (respectively). The application details may be application details that would become apparent to one of ordinary skill in the art after reading the descriptions herein. According to some illustrative approaches, the application details include, e.g., a number of database tables, a size of columns, a type of the columns, a type of language that is used by the application (such as Java, compiler based language, etc.), etc. Similarly, the infrastructure configuration details may be infrastructure configuration details that would become apparent to one of ordinary skill in the art after reading the descriptions herein. According to some illustrative approaches, the infrastructure configuration details may include, e.g., whether a current virtual machine has dedicated CPU allocated, whether the current virtual machine has shared CPU allocated, an amount of memory allocation, an amount of CPU allocation (for shared approaches), a number of processors dedicated to the current virtual machine, etc. Yet furthermore, the operational environment details may be operational environment details that would become apparent to one of ordinary skill in the art after reading the descriptions herein. According to some illustrative approaches, the operational environment details may include, e.g., a number of processors that are currently running in a predetermined pattern, a number of operations that are currently running in a predetermined pattern, a number of applications that are currently running in a predetermined pattern, a maintenance level of the operational environment, etc.

The first pattern information preferably includes NFRs. The first pattern information may, in some approaches, be collected using techniques for performing static code analysis (application code review) of a type that would become apparent to one of ordinary skill in the art after reading the descriptions herein. The first pattern information may, in some other approaches, additionally and/or alternatively be collected using techniques for analyzing an underlying infrastructure configuration provided to the current DevOps environment that the first operational run cycle is run in in the form of CPU cycle allocation, memory slice assigned, storage disk availability, etc. In yet some additional approaches, the first pattern information may, in some other approaches, additionally and/or alternatively be collected by performing an analysis of dynamic run time data from the DevOps environment using techniques that would become apparent to one of ordinary skill in the art after reading the descriptions herein.

More than one of the timestamps of the plurality of timestamps may, at least partially overlap, with the problematic timestamp. Accordingly, in some preferred approaches, method 200 includes considering each of the timestamps. For example, decision 232 includes determining whether to proceed to an analytical phase of the method 200. Such a determination may be based on whether additional timestamps have not yet been considered. In response to a determination that at least one of the timestamps have not yet been considered, e.g., as illustrated by the "No" logical path of decision 232, method 200 returns to decision 220. In contrast, in response to a determination that all of the timestamps have been considered, e.g., as illustrated by the "Yes" logical path of decision 232, one or more optional operations may be performed to prepare the collected first pattern information in an analytical phase of the method 200. For example, method 200 optionally continues to operation 234 in which all the captured patterns are analyzed, e.g., the collected first pattern information. Analyzing the first pattern information may, in some approaches, include extracting numerical metric data of a predetermined type, e.g., operational values, for inputting into a predetermined weightage algorithm, as will be described elsewhere herein. In some approaches, method 200 additionally and/or alternatively includes associating the inputs and processes with the runtime environment, e.g., see operation 236. The associating may, in some approaches, include generating metadata associated with inputs to the first operational run cycle of the application. The metadata may, in one or more of such approaches, indicate the specific metrics that were used as the input. More specifically, the metadata may be based on inputs that are determined to have been used within a predetermined amount of time of the failure event occurring.

Operation 238 includes considering failed step parameters as a priority. In other words, in some approaches, a plurality of step parameters may be included in one of the timestamp intervals that at least partially overlap with the problematic timestamp. However, in some approaches, only a portion of these step parameters may be determined to contribute to at least one of the failure events and/or sub-par runtime performance(s) that occur. Accordingly, techniques that would become apparent to one of ordinary skill in the art after reading the descriptions herein may be used to determine and filter-out step parameters that are not failed step parameters. In some approaches, for at least a portion of time that analysis is performed to determine how to mitigate the NFR issues in a subsequent operational run cycle of the application, the failed step parameters may be flagged and/or the failed steps may be suspended. Information associated with this flagging and/or suspension may be incorporated, e.g., updated to include, into a predetermined runtime automation steps knowledge base, e.g., see operation 240.

Operation 242 includes reviewing a current test coverage, e.g., a current collection of test cases. In some approaches, the review may be performed by initiating a predetermined process for applying the first pattern information to a predetermined weightage algorithm. It may be prefaced, that in such a predetermined process, all the NFRs and functional requirements (FRs) are preferably captured and processed through a computer oriented mathematical algorithm. During this processing, all the NFRs are assigned a pre-defined place values, and based that the algorithm, a weightage-based decision is calculated for determining whether to infuse one or more changes in the DevOps process. The decision may additionally and/or alternatively be calculated for defining the test case coverage, and to identify new test cases requirement. In some approaches, all the place values are refined based on continuous learning-based model that is, in some approaches, a self-educating process. Individual NFRs may be reviewed against industry level benchmarks and the place values may be revised accordingly for each application.

Operation 242 optionally continues to operation 244 which includes applying the first pattern information, e.g., the first pattern information determined to be associated with a first timestamp interval that is determined to at least partially fall within a problematic timestamp associated with the application failure event and/or sub-par runtime performance(s), to a predetermined weightage algorithm. In some preferred approaches, applying the application details associated with a first timestamp interval to the predetermined weightage algorithm includes calculating a first coverage weight. For context, the first coverage weight is a weightage that represents an overall impact and requirement to update the current collection of test cases. The first coverage weight may additionally and/or alternatively be based on the NFRs. The NFRs are typically related to performance, reliability, scalability, availability, and security of the application during runtime. Various examples of NFRs for the runtime environment of the application are described below. For example, in some approaches, a first of the NFRs may be based on performance. This NFR defines the expected performance levels of the application during runtime, including response time, throughput, and resource utilization. For example, the application may be configured to and/or responsible for responding to user requests within a certain timeframe and/or processing a predetermined number of transactions per second. In yet another approach, the NFRs may additionally and/or alternatively be based on reliability. A reliability NFR specifies the expected level of reliability and stability of the application during runtime. For example, the application may be configured to and/or responsible for having a minimum uptime percentage, indicating the amount of time that the application should be available and operational without experiencing downtime or crashes. Another NFR may be based on scalability. For example, a scalability requirement may define how the application handles increasing levels of load and/or user requests during runtime. In some approaches, the scalability requirement may specify that the expected capacity of the application be able to handle concurrent users or transactions, and how the application is to scale across multiple hardware resources, e.g., such as servers or clusters. In another approach, an availability NFR may specify the expected level of availability of the application during runtime. This may refer to the ability of the application to be accessible and functional at all times, without any interruptions or downtime. Furthermore, the availability NFR may include requirements for backup and disaster recovery mechanisms, high availability configurations, and/or fault tolerance. In another approach, a security NFR may be a requirement that defines the expected level of security for the application during runtime. To do this, the security NFR may include requirements related to authentication, authorization, data encryption, and/or other security measures to protect the application and its data from unauthorized access, breaches, or data leaks. Meanwhile, a compliance NFR may be a requirement that specifies the need for the application to comply with relevant laws, regulations, standards, or industry best practices during runtime. For example, the compliance NFR may require the application to adhere to data privacy regulations, industry-specific compliance standards, or internal security policies. A monitoring and logging NFR may specify the need for the application to have built-in monitoring and logging capabilities during runtime, to track and record various metrics, events, and errors for troubleshooting, analysis, and auditing purposes. The above mentioned NFRs are just some illustrative examples related to the runtime environment of an application. It is important to clearly define and document these requirements during a software development process to ensure that the application performs optimally and meets the expected quality levels during runtime. Accordingly, in response to a determination that a gap exists within a collection of test cases, e.g., where the gap is based on one or more of these NFRs not being reflected in the test cases (detection of a predetermined metric having a value of zero in the predetermined weightage algorithm), one or more operations may be performed to update the current collection of test cases. Such an update operation is described elsewhere below, e.g., see operation 254.

The predetermined weightage algorithm preferably incorporates a plurality of different predetermined factors. These predetermined factors may include, e.g., application runtime performance requirements, application runtime reliability requirements, application scalability requirements, application availability requirements, and application runtime security requirements, etc. One or more of these predetermined factors may be ensured to be reflected in the current collection of test cases by causing the first coverage weight to be based on one or more of the NFRs described herein. For example, the first coverage weight may, in some approaches, be calculated by applying different predetermined weightages to data associated with different portions of the first pattern data. In some preferred approaches, each of the different portions of the first pattern data are based on different types of NFRs. For example, in one illustrative approach, the predetermined weightages to data associated with different portions of the first pattern data includes adding a 25% weightage for a number of use cases, subtracting a 2% weightage for previous failure events and/or sub-par runtime performance(s), and adding a 30% weightage for coverage for predetermined infrastructure and operations associated with the application. In another illustrative approach, the predetermined weightages to data associated with different portions of the first pattern data includes applying a relative 5% weightage to a metric of the predetermined weightage algorithm that is based on a CPU security NFR, applying a relative 5% weightage to a metric of the predetermined weightage algorithm that is based on a capacity NFR, applying a relative 5% weightage to a metric of the predetermined weightage algorithm that is based on a reliability NFR, applying a relative 5% weightage to a metric of the predetermined weightage algorithm that is based on a compatibility NFR, applying a relative 5% weightage to a metric of the predetermined weightage algorithm that is based on an availability NFR, applying a relative 5% weightage to a metric of the predetermined weightage algorithm that is based on a maintainability NFR, applying a relative 5% weightage to a metric of the predetermined weightage algorithm that is based on a recoverability NFR, applying a relative 5% weightage to a metric of the predetermined weightage algorithm that is based on a serviceability NFR, applying a relative 5% weightage to a metric of the predetermined weightage algorithm that is based on a scalability NFR, and applying a relative 5% weightage to a metric of the predetermined weightage algorithm that is based on a useability NFR.

The calculated first coverage weight may, in some approaches, be based on the predetermined collection of test cases and the application details. By considering all of the NFRs described above, the predetermined weightage algorithm may be used to determine how to relatively improve a current coverage of the current collection of test cases. One preferred technique for determining how to relatively improve a current coverage of the current collection of test cases includes performing a predetermined comparison. For example, the comparison may, in some approaches, include comparing the first coverage weight to a second coverage weight, e.g., see decision 246. The second coverage weight is preferably based on the predetermined collection of test cases and is not based on the application details. In some approaches, the second coverage weight is based on a previous operational run cycle of the application, a predetermined threshold model run cycle of the application, etc. In some approaches, a determination is made that test coverage gaps exist in the predetermined collection of test cases in response to a determination that results of the comparison reveal that the first coverage weight is less than the second coverage weight. In other words, the results of the comparison revealing that the first coverage weight is less than the second coverage weight may indicate that the most recent run cycle of the application, e.g., the first run cycle, that is based on a current collection of test cases resulted in a relatively underperforming application, e.g., test cases of the most recently performed operational run cycle did not improve the test case coverage weightage. In response to a determination, based on the output of the predetermined weightage algorithm resulting from applying the application details associated with a first timestamp interval to the predetermined weightage algorithm, that test coverage gaps exist in the predetermined collection of test cases, method 200 preferably includes causing the predetermined collection of test cases to be updated. More specifically, in some preferred approaches, causing the predetermined collection of test cases to be updated includes causing test cases to be created based on the first pattern information for mitigating at least the NFR issue during a subsequent operational run cycle of the application. Known techniques that would become apparent to one of ordinary skill in the art after reading the descriptions herein may be used for creating additional test cases using the collected first pattern information.

In some approaches, an automated script is used for updating the predetermined collection of test cases. For example, decision 248 includes determining whether an automated script is available for use to update the predetermined collection of test cases. In response to a determination that an automated script is available for use to update the predetermined collection of test cases, e.g., as illustrated by the "Yes" logical path of decision 248, the method optionally continues to operation 254, and the automated script is used for updating the predetermined collection of test cases. In some other approaches, the automated script may be determined to not be available, e.g., as illustrated by the "No" logical path of decision 248. In response to such a determination, input received from and/or associated with a subject matter expert (SME) may be incorporated into the predetermined collection of test cases to thereby update the test cases, e.g., see operations 250 and 252. It should be noted that, in some approaches, the input received from the SME may be transformed into machine learning code that is used to then input into a predetermined machine learning model. In some approaches, the current collection of test cases may be updated by filtering out information that was not otherwise manually reviewed in order to transform the data into machine learning code.

In contrast to some approaches above, a determination may be made that test coverage gaps do not exist in the predetermined collection of test cases in response to a determination that the results of the comparison reveal that the first coverage weight is greater than or equal to the second coverage weight.

In some approaches, updating the collection of test cases may optionally include one or more test cases. For example, in some use cases, only a predetermined threshold number of test cases may be used for training a machine learning model. Accordingly, in response to a determination that the new test cases cause the predetermined threshold number of test cases to be exceeded, method 200 may include trimming one or more of the existing test cases, e.g., one or more relatively oldest test cases, test cases based on NFRs having a relatively lowest assigned weightage in the predetermined weightage algorithm, etc.

Creation of and/or application of the created test cases may, in some approaches, be performed using an automated test creator of a type that would become apparent to one of ordinary skill in the art after reading the descriptions herein. Accordingly, in one or more of such approaches, the automated test creator may be updated, e.g., see operation 256, for future reference, e.g., updated to be caused to apply the created test cases during a training of a predetermined machine learning model (which may be an artificial intelligence model) thereafter.

Operation 258 includes causing at least a portion of the predetermined collection of test cases and the test cases created based on the first pattern information to be used for training a predetermined learning model. Initial training of the machine learning model using the updated collection of test cases may include reward feedback that may, in some approaches, be implemented using a SME. However, to prevent costs associated with relying on manual actions of a SME, in another approach, reward feedback may be implemented using techniques for training a BERT model, as would become apparent to one skilled in the art after reading the present disclosure. Once a determination is made that the machine learning model has achieved a redeemed threshold of accuracy in performing the operations described herein during this training, a decision that the model is trained and ready to deploy for performing techniques and/or operations of method 200 may be made. In some further approaches, the AI model may be a neuromyotonic AI model that may improve performance of computer devices in an infrastructure associated with the DevOps environment and/or the application, because the neuromyotonic AI model may not need a SME and/or iteratively applied training with reward feedback in order to accurately perform operations described herein. Instead, the neuromyotonic AI model is configured to itself make determinations described in operations herein. Such a machine learning model ensures that gaps within the test cases continue to be refined, where the scale of such analysis and determinations would not otherwise be feasible for a human to perform. This is because humans are not able to efficiently audit runtime information in real time (real time of the operational run cycle), and would otherwise incorporate processing delays and errors in the process of attempting to do so. Accordingly, management of operations described herein is not able to be achieved by human manual actions. The trained predetermined learning model may thereafter be used for performing a second operational run cycle of the application, e.g., see operation 260. By filling gaps identified in the predetermined collection of test cases, failure events and/or sub-par runtime performance(s) are proactively avoided in each operational run cycle of an application. As a result of ongoingly addressing issues with the collection of test cases that would otherwise cause failure events and/or sub-par runtime performance(s), performance of the application and the DevOps environment relatively improves.

Figure 3A:
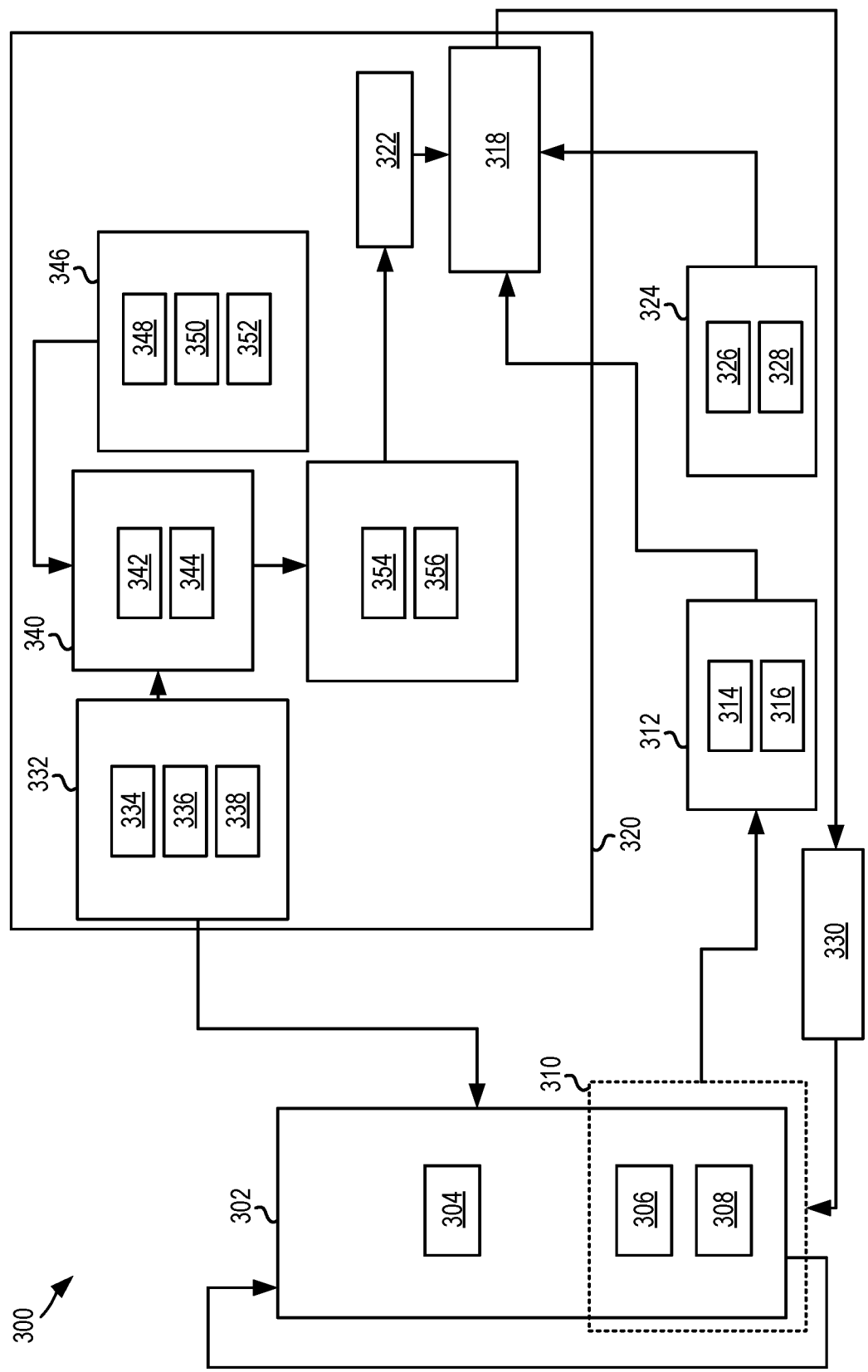
FIGS. 3A-3B are overviews of a DevOps environment, in accordance with several embodiments of the present invention.
Figure 3B:
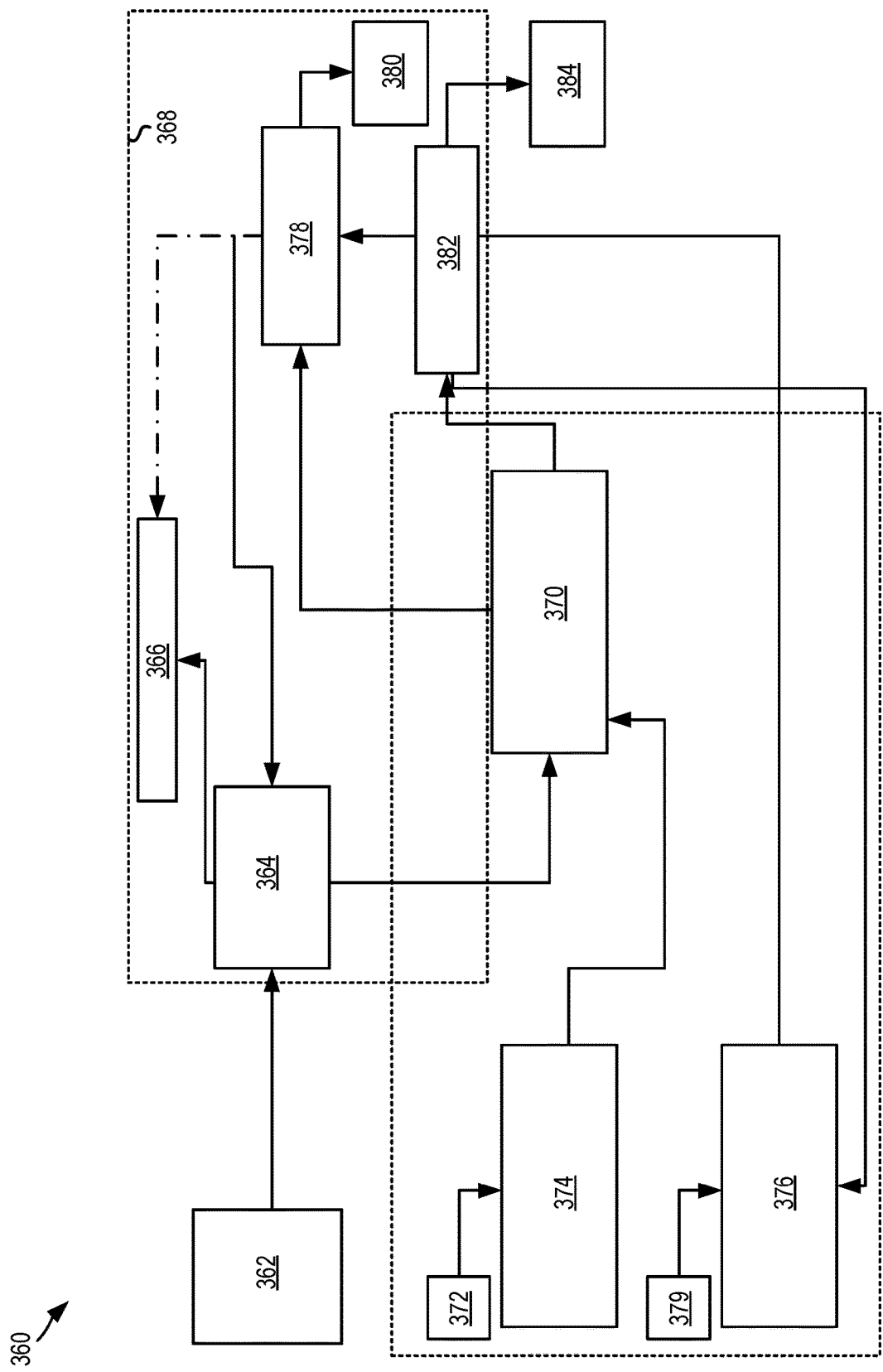

FIGS. 3A-3B depict DevOps environments 300 and 360, in accordance with several embodiments. As an option, the present DevOps environments 300 and 360 may be implemented in conjunction with features from any other embodiment listed herein, such as those described with reference to the other FIGS. Of course, however, such DevOps environments 300 and 360 and others presented herein may be used in various applications and/or in permutations which may or may not be specifically described in the illustrative embodiments listed herein. Further, the DevOps environments 300 and 360 presented herein may be used in any desired environment.

Referring first to FIG. 3A, the DevOps environment 300 includes a first module 302 that may include DevOps components that are configured to perform typical runtime operations 304, e.g., such as continuous development operations, continuous integration operations, continuous testing operations, continuous deployment operations, continuous feedback operations, etc. The first module 302 may additionally and/or alternatively include a sub-portion 310 of components 306 and 308 that are preferably configured to perform continuous monitoring operations and continuous operations that generate information that is output to a second module 312. The second module 312 includes a first analysis component 314 and a second analysis component 316 that are configured to analyze the information received from the sub-portion 310. The first analysis component 314 and the second analysis component 316 are, in some approaches, configured to perform continuous learning to discover the NFR (runtime, CPU, memory usage, batch optimization, interdependencies with other applications, various system and operation logs, etc.) using different mainframe monitoring tools such as Omegamon.

An output of the second module 312 may be input into a predetermined component 318 of an infrastructure component module 320. The predetermined component 318 is configured to receive DevOps process optimization information 322 to determine updates for a current collection of test cases, which may then be output to the first module 302, e.g., output as application/environment data points 330 for future development cycles. Sub-portions 326 and 328 of module 324 may be configured to use information obtained from continuous monitoring operations and continuous operations to determine NFR data point information. The determined NFR data point information may be input into the predetermined component 318.

The infrastructure component module 320 may additionally and/or alternatively include module 332 that includes an analysis component 334, a recommendation component 336 and a metrics and/or proposed actions determination component 338. Such components may be configured to perform one or more operations of method 200 in order to perform automated dynamic learning based pattern analysis and downstream test coverage determinations. Outputs of the module 332 may be used as input for module 340 that includes a predetermined type of knowledge base component 342 and a pattern continuous learning component 344 of a type that would become apparent to one of ordinary skill in the art after reading the descriptions herein. Input received from another module 346 that is based on at least one of an application log 348, an infrastructure log 350 and an operational log 352 may additionally and/or alternatively be fed into the module 340.

An output of the module 340, in some approaches, includes training data that may be used for a predetermined prediction model 354 and/or a predetermined learning based model 356. An output from such models may be added to the DevOps process optimization information 322.

Referring now to FIG. 3B, it may be prefaced that the DevOps environment 360 may provide a sample implementation plan that may be implemented on a mainframe of a type that would become apparent to one of ordinary skill in the art after reading the descriptions herein. The DevOps environment 360 may include a mainframe production module 362 that is configured to process information, e.g., batch information, database information, application information, infrastructure information, etc. In some approaches, issues within the mainframe environment may be reported by the mainframe production module 362 to an end to end assistance framework 364 (which may be included in a predetermined type of script deployment 368) that is configured to obtain access to information processed by the mainframe production module 362. A predetermined tool 366 may be deployed to identify all of the potential NFR data points, e.g., using the reported information. The end to end assistance framework 364 may also be configured to output information to a predetermined module 370 that is configured to be trained using the information. The predetermined module 370 may be configured to track previous occurrences of issues and resolution steps and capture unique scenarios (anomalies) therein. The predetermined module 370 may, in some approaches, be configured to receive test case updates from a SME 372 and/or application architect 374 that provides data points and/or automated pattern discovery tools.

The DevOps environment 360 may additionally and/or alternatively include a runbook automation steps database 376, which may be monitored by a predetermined user device 379. An output of the runbook automation steps database 376 may, in some approaches, be used as input for an automated test steps creator 378 of a type that would become apparent to one of ordinary skill in the art after reading the descriptions herein. In some approaches, an output of the automated test steps creator 378 includes an optimized DevOps scenario 380, which may include new test cases generated in response to a determination that gaps exist in a current collection of test cases. Furthermore, in some approaches, the predetermined module 370 may be configured to output model training information that is used for self-educating model 382 of a type that would become apparent to one of ordinary skill in the art after reading the descriptions herein. An output of the self-educating model 382 may, in some approaches, include suggestions 384 for a development cycle.

With general reference now to FIGS. 3A-3B, it should be noted that the environments 300 and 360 may be used in accordance with one or more predetermined use cases. For example, a first "SMART"-based use case may be based on a predetermined database being updated with inputs of FRs and NFRs. A predetermined DevOps process may be performed that includes one or more operations described elsewhere herein, e.g., see method 200. In some approaches, such operations may include making decisions that include infra-level SMARTness, which includes selecting and spinning a relatively most suitable run environment (supporting a pay as you go module). The DevOps process may additionally and/or alternatively include operations for ensuring optimum resource utilization, e.g., such as scheduling and/or selecting a time and/or date of a continuous pipeline run. Operations for ensuring a cognitive orchestration pipeline may be based on a quality gate or code coverage benchmark, and may include promoting and/or demoting the deployed package in a relatively higher region, e.g., as done in some domain projects. The DevOps process may additionally and/or alternatively include operations for ensuring application level SMARTness by selecting a set of test cases for the respective impacted downstream suite of applications and/or modules. Further, such an operation may include selecting a type of test cases, e.g., functional, non-functional, regression, etc.

In some other approaches, an NFR-based use case may be deployed for eCommerce web applications, during which monitoring of following NFR matrices during a testing phase plays a relatively important role. This use case may be useful for relatively improving an overall performance, an overall response time, a page load time, user interface responsiveness, etc., in a DevOps environment in which the techniques described herein are implemented.

As a result of deploying the techniques described herein in a DevOps environment, an end-to-end model for capturing the dynamic impact of potential updates to a current collection of test cases is created. A knowledge base to capture patterns for an application environment is also created. In some approaches, this use case includes operations for capturing a pattern of the code snippet during runtime activity, querying a database to find impacted module, identifying patterns for determining a performance impact of changes, etc. Based on the pattern a coverage of activity may be defined, e.g., steps to start and to stop. In some approaches, this use case may be an end to end process to collate all the changes and an analysis to ensure that heighted optimized DevOps scenarios to ensure that changes in code are thereafter reflected in a current collection of test cases. In some approaches, these techniques may be used for mainframes as an inclusive DevOps strategy to accelerate mainframe application delivery by months or weeks as compared to traditional relatively time consuming delivery processes. Accordingly, efficiency is achieved as a result of using the techniques described herein, e.g., at least in part as a result of the relatively faster development of new applications, as a result of the relatively improved quality of application operational run cycles, etc.

Figure 4:
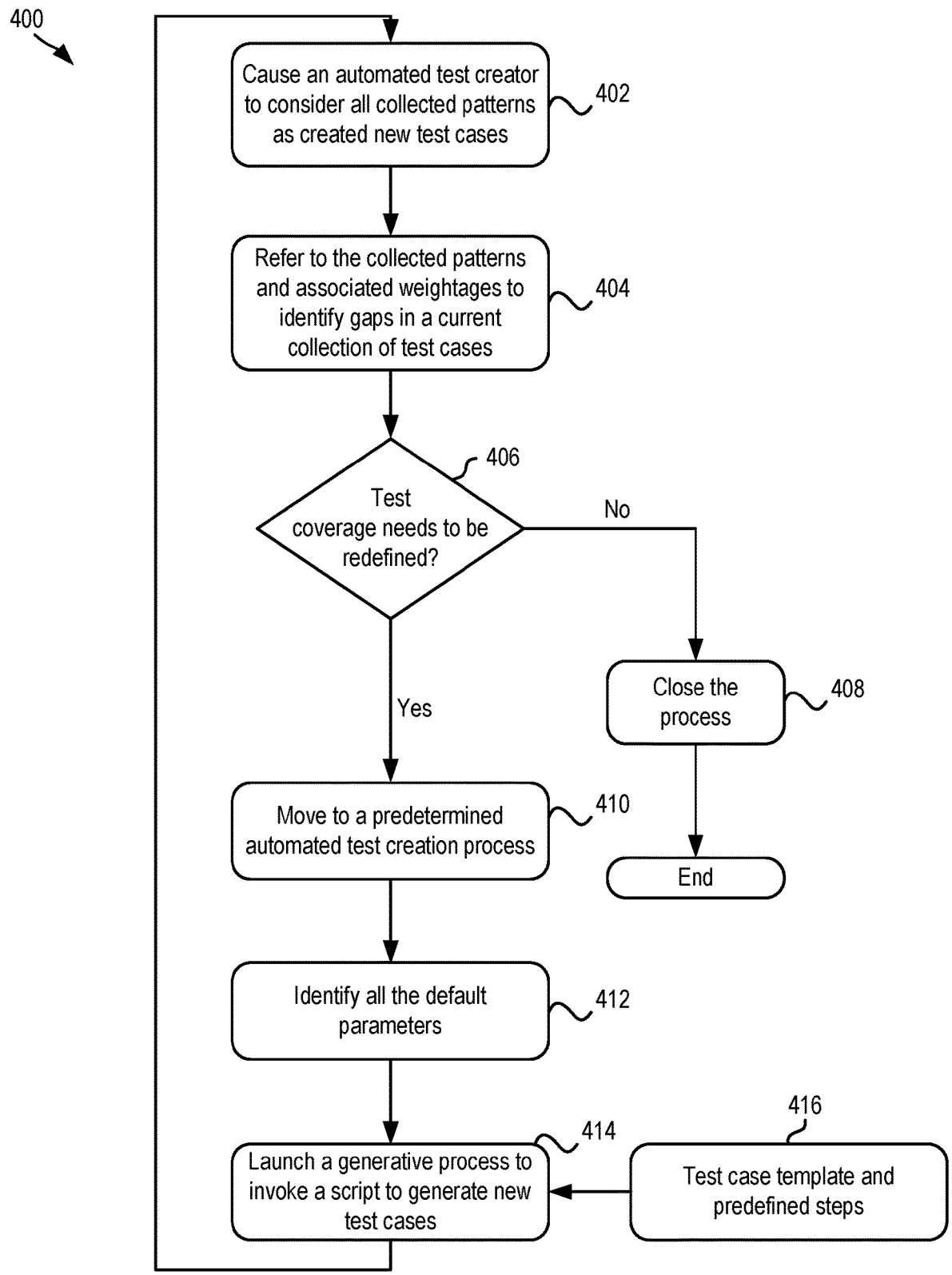
FIG. 4 is a flowchart of a method, in accordance with one embodiment of the present invention.

Now referring to FIG. 4, a flowchart of a method 400 is shown according to one embodiment. The method 400 may be performed in accordance with the present invention in any of the environments depicted in FIGS. 1-7, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that, in some use cases, method 400 includes operations that may be performed by a computer that acts as an automated test step creator that is configured to perform a predetermined test case generation process described in further detail below.

In some approaches, method 400 includes a data collection operation that includes gathering a comprehensive set of captured NFR and pre-provided FRs of existing test cases for the system or application under test (AUT). These test case latest parameters are, in some preferred approaches, picked from a predetermined database during a refinement process, which may be performed with each application run. Operation 402 includes causing an automated test creator to consider all collected patterns as created new test cases. These patterns may be determined from and/or extracted from the captured NFR and/or the FR information associated with a given operational run cycle of the application.

In some approaches, method 400 includes processing the pattern data. For example, method 400 may include cleaning and preprocessing the collected test cases parameters to remove duplicates, inconsistencies, and irrelevant information collected during the pattern capture process, e.g., using techniques that would become apparent to one of ordinary skill in the art after reading the descriptions herein. Method 400 may additionally and/or alternatively include organizing a test case template into a structured format that can be easily used as input for the generative AI model concept, which may be based Python scripts.

Operation 404 includes referring to the collected patterns and associated weightages to identify gaps in a current collection of test cases. In some approaches, the gaps may be identified (if any) using a comparison technique described elsewhere herein, e.g., see method 200. In some approaches, such an identification may be based on a determination of whether the test coverage needs to be redefined, e.g., see decision 406. In one or more of such approaches, such a determination may be based on a determination of whether a considered weightage is less than a predetermined threshold, e.g., 80%. In response to a determination that the test cases do not need to be refined, e.g., as illustrated by the "No" logical path of decision 406, the process may be closed and ended, e.g., see operation 408. In contrast, in response to a determination that the test cases need to be refined, e.g., as illustrated by the "Yes" logical path of decision 406, the method continues to operation 410.

In operation 410, the method 400 moves to a predetermined automated test creation process. In some approaches, the predetermined automated test creation process includes performing one or more sub-operations of a test case creation model training process. In some approaches, the test case creation model training process includes training a language model, such as a recurrent neural network (RNN) or a transformer, using the preprocessed test cases as training data. The model is preferably capable of generating natural language text and has an ability to learn from the patterns and structures in the test cases. In some approaches, a predetermined test case generation step is activated once the model is trained, and it may be used to generate new test cases automatically. Method 400 may, in some approaches, include providing prompts or input to the model, such as a description of a feature or a specific test scenario, and letting the model generate test cases based on the patterns the model learned during training. In one or more of such approaches, a desired format and structure of the test cases may be specified, e.g., such as input data, expected output, assertions, etc. Test case validation may be performed during which the generated test cases are validated to ensure that they are relevant, meaningful, and cover the desired testing objectives. The generated test cases may be reviewed to identify any inconsistencies or errors. In some approaches, a SME may be caused to manually review the generated test cases during an initial stage of rolling out the process. In response to a determination that post process maturity is achieved, such review is not used. Once the generated test cases are validated, the test cases may be caused to be executed automatically using a suitable test automation framework. The test results can be logged and analyzed to identify any defects or issues in the test case generation step. In some approaches, iterative refinement steps may be performed that include continuously iterating and refining the generative AI process-based python script based on feedback received from test execution results, domain expertise, and evolving requirements. For example, in some approaches, method 400 includes launching a generative process to invoke a script to generate new test cases, e.g., see operation 414, which may consider test case templates and/or other predetermined steps, e.g., see operation 416. The script may, in some approaches, be developed based on a concept of generative AI, and may leverage predefined test case steps and templates to tailor for predefined NFR issues. Refinement may, in some approaches, include identifying the default parameters and filtering out test cases that are repeats of another test case, e.g., see operation 412. This can involve retraining the model, updating the training data, or fine-tuning the generated test cases to improve quality and effectiveness.

FIG. 5 depicts a table 500, in accordance with one embodiment. As an option, the present table 500 may be implemented in conjunction with features from any other embodiment listed herein, such as those described with reference to the other FIGS. Of course, however, such table 500 and others presented herein may be used in various applications and/or in permutations which may or may not be specifically described in the illustrative embodiments listed herein. Further, the table 500 presented herein may be used in any desired environment.

Table 500 includes information for two scenarios, e.g., see scenario 1 and scenario 2. Each of the scenarios may be different operational run cycles of an application in a DevOps environment. Furthermore, the information for each of the scenarios is broken down over a plurality of stages of the operational run cycles of the application.

The information of the table may be analyzed to determine whether a failure event has occurred during either of the operational run cycles. A predetermined natural language processing technique that would become apparent to one of ordinary skill in the art after reading the descriptions herein may be used to determine that the results of the first operational run cycle of an application, i.e., scenario 1, do not include indications of a failure event having occurred in the first operational run cycle of an application. For context, in table 500, bolded text is used to indicate indications of a failure event having occurred. For example, referring now to the information associated with scenario 2, the table 500 includes some bolded results of the second operational run cycle of the application that indicate failure events and/or sub-par runtime performance(s) having occurred, e.g., see "not working", "returning large amount of data", "issue noticed", etc. In some preferred approaches, in response to a determination that such failure events and/or sub-par runtime performance(s) have occurred during the second operational run cycle of the application, further operations described elsewhere herein in method 200 may be performed for creating test cases based on gaps identified in a collection of test cases.

Figure 6:
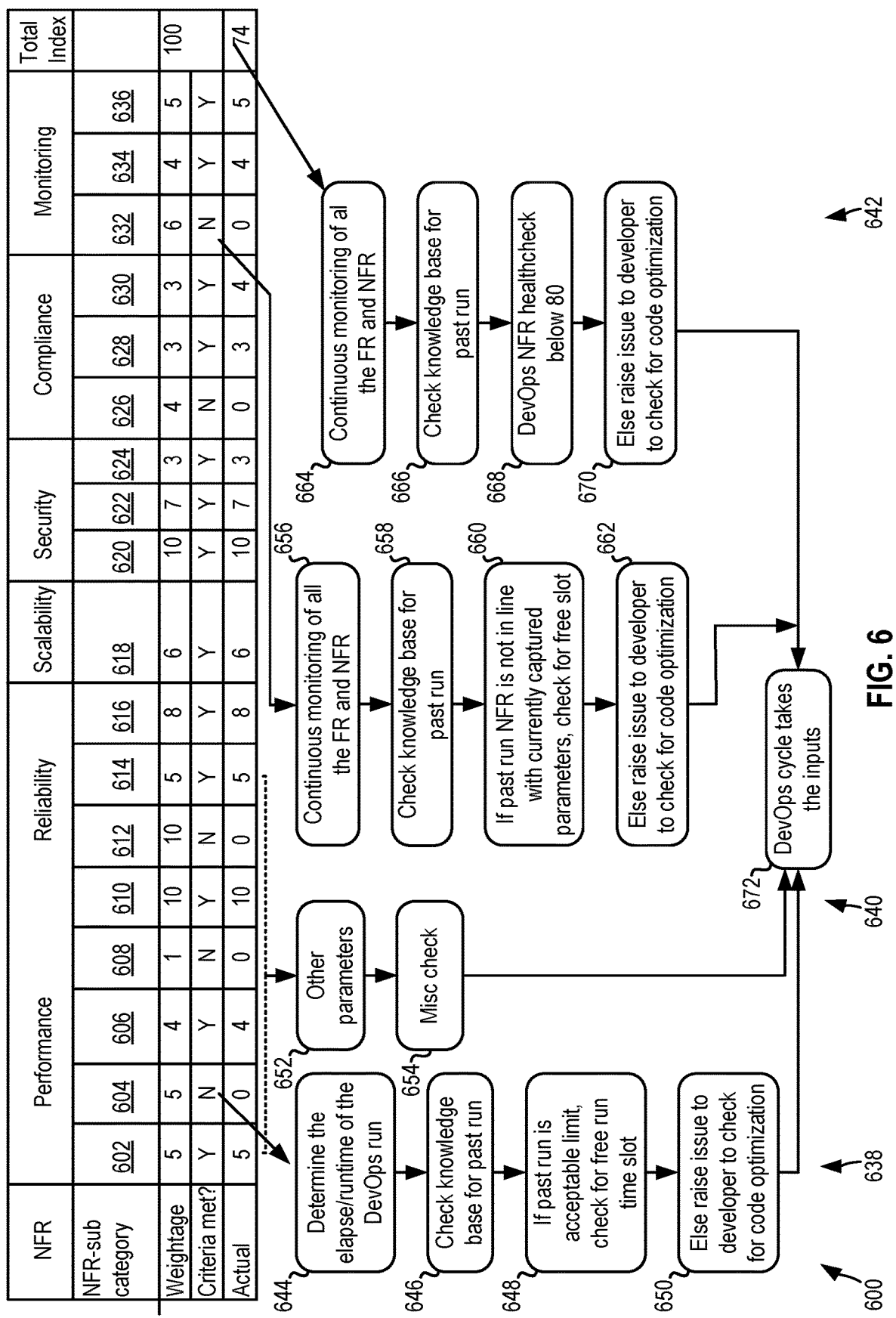
FIG. 6 is a table, in accordance with one embodiment of the present invention.

FIG. 6 depicts a table 600 with several operational responses, in accordance with one embodiment. As an option, the present table 600 may be implemented in conjunction with features from any other embodiment listed herein, such as those described with reference to the other FIGS. Of course, however, such table 600 and others presented herein may be used in various applications and/or in permutations which may or may not be specifically described in the illustrative embodiments listed herein. Further, the table 600 presented herein may be used in any desired environment.

The table 600 includes information associated with running operational cycles of an application in a DevOps environment. The table includes information arranged with respect to a plurality of NFRs. The information is furthermore arranged with respect to a plurality of NFR-sub categories, e.g., see response time 602, run time 604, throughput 606 (such as number of transmissions/second), resource utilization 608, maintainability 610, availability 612, downtime 614, recoverability 616, scalability 618, authentication 620, authorization 622, data encryption 624, data privacy regulations 626, industry specific regulations 628, internal security policies 630, logging 632, tracking 634, and auditing 636.

A determination may be made, based on the information of the table, that a failure event has occurred. For example, criteria is determined to be not met in a plurality of the NFRs, e.g., see "N". In response to a determination that at least one failure event has occurred, predetermined use case operations may be performed. For example, a plurality of use case operations are included in each of a first use case 638, a second use case 640, and a third use case 642.

In the first use case 638, an elapse/runtime of the DevOps run is determined using techniques that would become apparent to one of ordinary skill in the art after reading the descriptions herein, e.g., see operation 644. A knowledge base may be checked for a past run, e.g., see operation 646. In response to a determination that a past run of the application resulted in a predetermined limit not being exceeded, a free run slot may be checked for to determine whether there is sufficient space to store the current runtime information, e.g., see operation 648. Alternatively, a notification may be output to a predetermined user device to notify a developer to check for code optimization to mitigate the failure events and/or sub-par runtime performance(s) in subsequent runs, e.g., see operation 650. In an alternative approach, other parameters and miscellaneous checks of a type that would become apparent to one of ordinary skill in the art after reading the descriptions herein may be used, e.g., see operations 652 and 654.

In the second use case 640, continuous monitoring of all the FR and the NFR is performed, e.g., see operation 656. Similar to the first use case, a knowledge base may be checked for a past run, e.g., see operation 658. In response to a determination that a past run NFR is not in line with currently captured parameters, a free slot is checked for, e.g., see operation 660. Alternatively, a notification may be output to a predetermined user device to notify a developer to check for code optimization to mitigate the failure events and/or sub-par runtime performance(s) in subsequent runs, e.g., see operation 662.

In the third use case 642, continuous monitoring of all the FR and the NFR is performed, e.g., see operation 664. Similar to the first use case, a knowledge base may be checked for a past run, e.g., see operation 666. In response to a determination that the DevOps healthcheck is less than a predetermined threshold, e.g., 80 out of 100, a determination may, in some approaches, be made that gaps exist in a current collection of test cases, e.g., see operation 668. Alternatively, a notification may be output to a predetermined user device to notify a developer to check for code optimization to mitigate the failure events and/or sub-par runtime performance(s) in subsequent runs, e.g., see operation 670.

The outputs of each of the use cases may, in some approaches, be used for causing test cases to be created for mitigating the NFR issue(s) during a subsequent operational run cycle of the application, e.g., see operation 672.

These use cases may be used to infuse runtime environmental NFR into the application development cycle and redesign a testing cycle process with new test cases or update the existing test cases. On some deployments, a "SMART" framework that is designed to automatically fetch the NFR data from previous run time environment history and provide the inputs to the code development/remediation and to design the comprehensive test cases, may be used. This enables application/environment changes for future application enhancements in the DevOps cycle, and the SMART framework provides a learning-based model of capturing the runtime datapoints. Within this framework, the runtime learning of functional requirements and NFRs are created in a predetermined and maintained knowledge base (KDB). Data points such as code identification pattern, business domain, all dependent application components downstream and up stream, historical patterns of the issues related to code, etc., may be collected, and an analytical algorithm may be applied to leverage the learning knowledge base to identify the impact in the downstream and target to provide the end-to-end refinement solution for all identified impacted downstream applications. This enables a process for automated checkout and assignment to a developer team as per the learning from past operational run cycles. Furthermore, the analysis operations described herein may be used to generate/update automated test cycle to incorporate all the impacted code and thereby offer an end-to-end automated process to ensure velocity in the DevOps environment that the application is run in.

Figure 7:
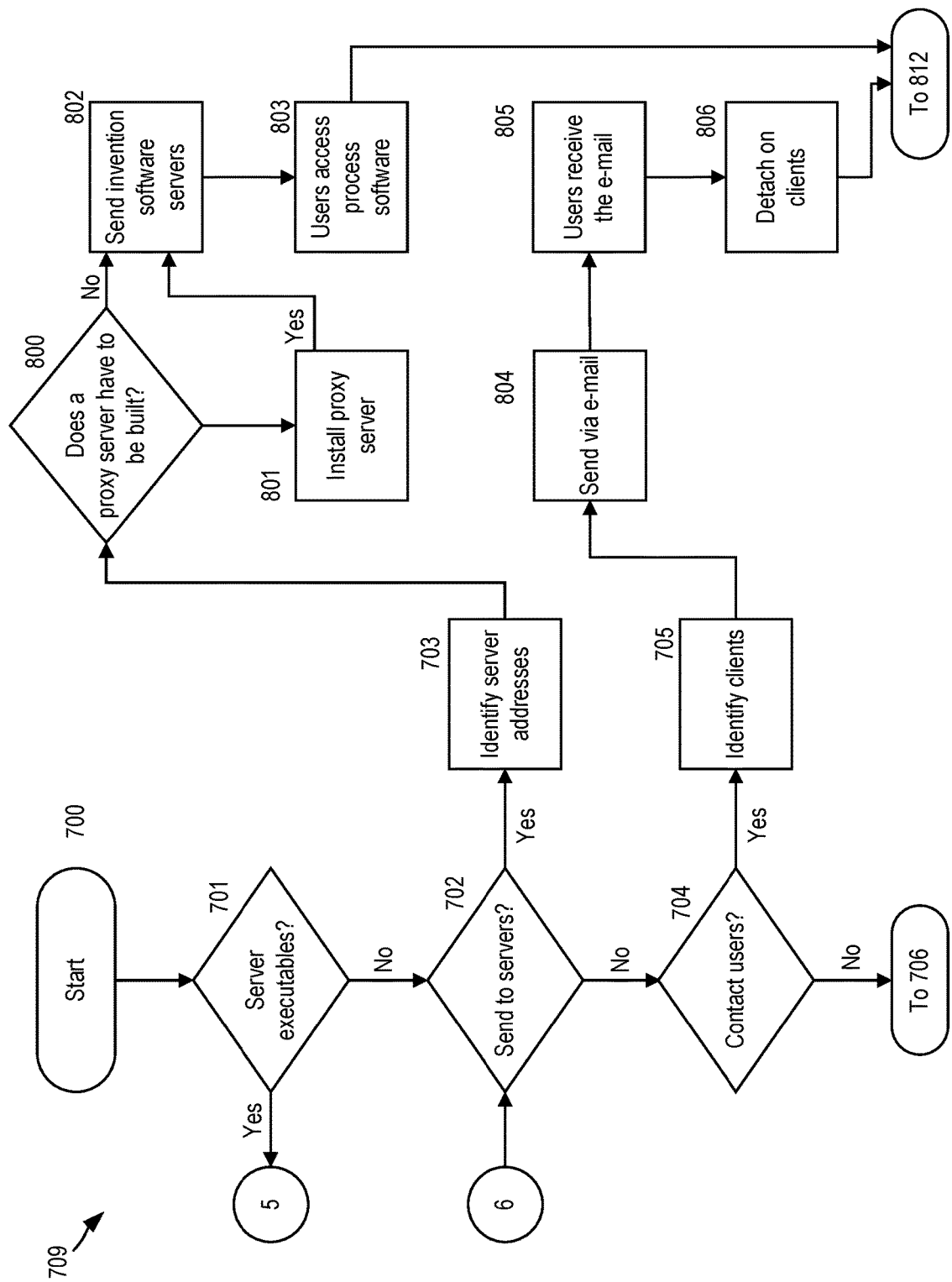
FIG. 7 is a flowchart of a method, in accordance with one embodiment of the present invention.
Figure 7:
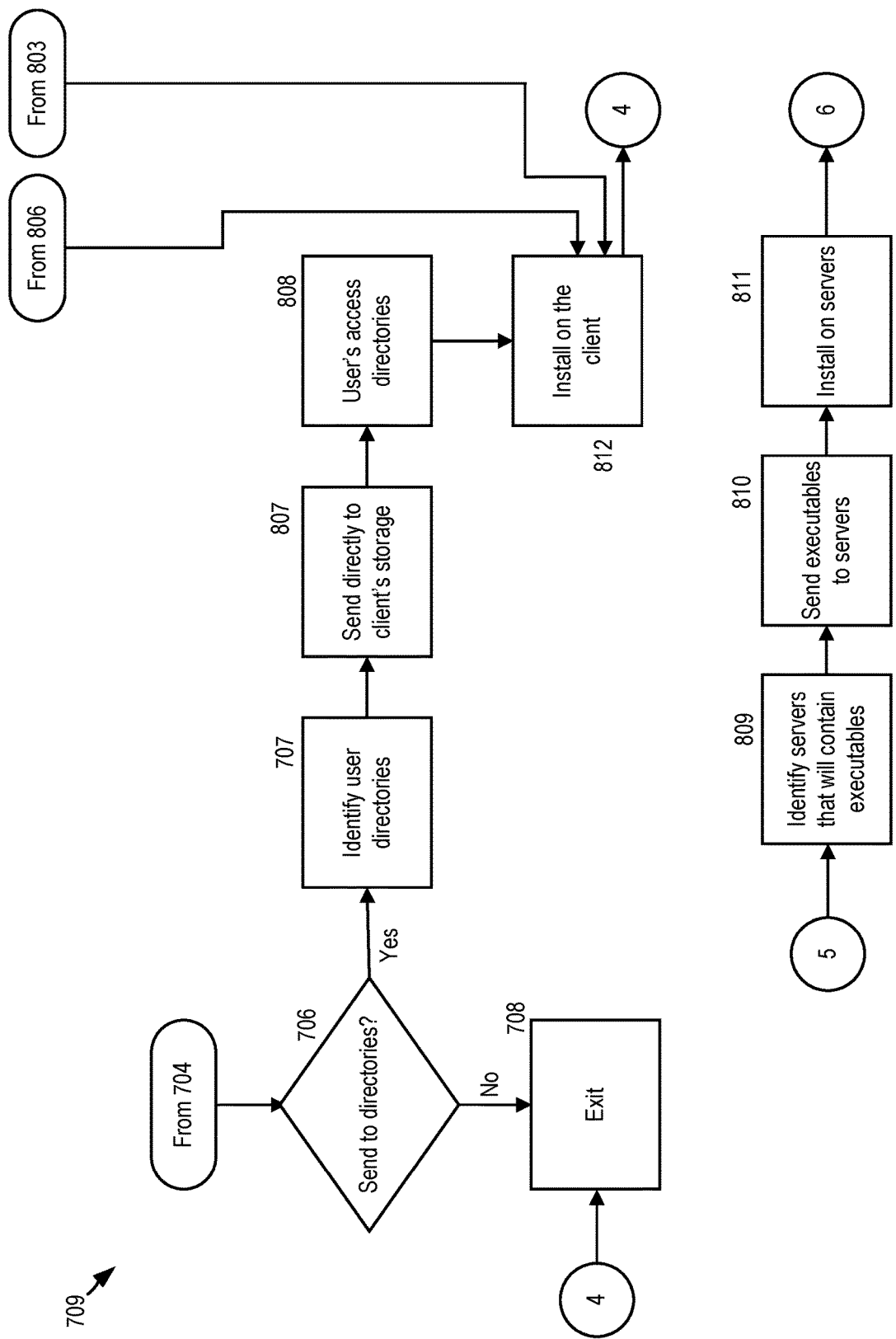

Now referring to FIG. 7, a flowchart of a method 709 is shown according to one embodiment. The method 709 may be performed in accordance with the present invention in any of the environments depicted in FIGS. 1-7, among others, in various embodiments. Of course, more or fewer operations than those specifically described in FIG. 7 may be included in method 709, as would be understood by one of skill in the art upon reading the present descriptions.

Each of the steps of the method 709 may be performed by any suitable component of the operating environment. For example, in various embodiments, the method 709 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 709. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with creating test cases based on gaps identified in a collection of test cases may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 709, step 700 begins the deployment of the process software. An initial step is to determine if there are any programs that will reside on a server or servers when the process software is executed (701). If this is the case, then the servers that will contain the executables are identified (809). The process software for the server or servers is transferred directly to the servers' storage via FTP or some other protocol or by copying though the use of a shared file system (810). The process software is then installed on the servers (811).

Next, a determination is made on whether the process software is to be deployed by having users access the process software on a server or servers (702). If the users are to access the process software on servers, then the server addresses that will store the process software are identified (703).

A determination is made if a proxy server is to be built (800) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (801). The process software is sent to the (one or more) servers either via a protocol such as FTP, or it is copied directly from the source files to the server files via file sharing (802). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (803). Another embodiment is to have the servers automatically copy the process software to each client and then run the installation program for the process software at each client computer. The user executes the program that installs the process software on his client computer (812) and then exits the process (708).

In step 704 a determination is made whether the process software is to be deployed by sending the process software to users via e-mail. The set of users where the process software will be deployed are identified together with the addresses of the user client computers (705). The process software is sent via e-mail (804) to each of the users' client computers. The users then receive the e-mail (805) and then detach the process software from the e-mail to a directory on their client computers (806). The user executes the program that installs the process software on his client computer (812) and then exits the process (708).

Lastly, a determination is made on whether the process software will be sent directly to user directories on their client computers (706). If so, the user directories are identified (707). The process software is transferred directly to the user's client computer directory (807). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (808). The user executes the program that installs the process software on his client computer (812) and then exits the process (708).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
in response to a determination, from results of analyzing runtime information associated with an application failure event and/or sub-par runtime performance that occurs during a first operational run cycle of an application, that the failure event and/or sub-par runtime performance is caused by a Non-Functional Requirement (NFR) issue, analyzing application details associated with a plurality of different timestamp intervals;
in response to a determination that a first of the timestamp intervals falls within a predetermined timestamp associated with the application failure event and/or sub-par runtime performance, collecting first pattern information about the application details associated with the first timestamp interval;
applying the first pattern information to a predetermined weightage algorithm; and
in response to a determination, based on an output of the predetermined weightage algorithm, that test coverage gaps exist in a predetermined collection of test cases, causing test cases to be created based on the first pattern information for mitigating the NFR issue during a subsequent operational run cycle of the application.

2. The computer-implemented method of claim 1, wherein the first pattern information is collected using techniques selected from the group consisting of: static code analysis, analysis of an underlying infrastructure configuration provided to a DevOps environment that the first operational run cycle is run in, and analysis of dynamic run time data from the DevOps environment.

3. The computer-implemented method of claim 1, wherein the first pattern information includes: application details, infrastructure configuration details and operational environment details.

4. The computer-implemented method of claim 3, wherein the application details are selected from the group consisting of: a number of database tables, a size of columns, a type of the columns, and a type of language; wherein the infrastructure configuration details are selected from the group consisting of: whether a current virtual machine has dedicated central processing unit (CPU) allocated, whether the current virtual machine has shared CPU allocated, an amount of memory allocation, an amount of CPU allocation, and a number of processors dedicated to the current virtual machine; and wherein the operational environment details are selected from the group consisting of: a number of processors that are currently running in a predetermined pattern, a number of operations that are currently running in a predetermined pattern, a number of applications that are currently running in a predetermined pattern, and a maintenance level of the operational environment.

5. The computer-implemented method of claim 1, comprising: causing the predetermined collection of test cases and the test cases created based on the first pattern information to be used for training a predetermined learning model; and using the trained predetermined learning model for performing a second operational run cycle of the application.

6. The computer-implemented method of claim 1, wherein applying the application details associated with a first timestamp interval to the predetermined weightage algorithm includes calculating a first coverage weight, wherein the first coverage weight is based on the predetermined collection of test cases and the application details.

7. The computer-implemented method of claim 6, comprising: comparing the first coverage weight to a second coverage weight, wherein the second coverage weight is based on the predetermined collection of test cases and is not based on the application details; and determining that test coverage gaps exist in the predetermined collection of test cases in response to a determination that results of the comparison reveal that the first coverage weight is less than the second coverage weight.

8. The computer-implemented method of claim 6, wherein the predetermined weightage algorithm incorporates a plurality of different predetermined factors selected from the group consisting of: application runtime performance requirements, application runtime reliability requirements, application scalability requirements, application availability requirements, and application runtime security requirements.

9. The computer-implemented method of claim 1, wherein an automated script is used for causing the test cases to be created.

10. A computer program product, the computer program product comprising a computer readable storage medium having program instructions embodied therewith, the program instructions readable and/or executable by a computer to cause the computer to:
in response to a determination, from results of analyzing runtime information associated with an application failure event and/or sub-par runtime performance that occurs during a first operational run cycle of an application, that the failure event and/or sub-par runtime performance is caused by a Non-Functional Requirement (NFR) issue, analyze application details associated with a plurality of different timestamp intervals;
in response to a determination that a first of the timestamp intervals falls within a predetermined timestamp associated with the application failure event and/or sub-par runtime performance, collect first pattern information about the application details associated with the first timestamp interval;
apply the first pattern information to a predetermined weightage algorithm; and
in response to a determination, based on an output of the predetermined weightage algorithm, that test coverage gaps exist in a predetermined collection of test cases, cause test cases to be created based on the first pattern information for mitigating the NFR issue during a subsequent operational run cycle of the application.

11. The computer program product of claim 10, wherein the first pattern information is collected using techniques selected from the group consisting of: static code analysis, analysis of an underlying infrastructure configuration provided to a DevOps environment that the first operational run cycle is run in, and analysis of dynamic run time data from the DevOps environment.

12. The computer program product of claim 10, wherein the first pattern information includes: application details, infrastructure configuration details and operational environment details.

13. The computer program product of claim 12, wherein the application details are selected from the group consisting of: a number of database tables, a size of columns, a type of the columns, and a type of language; wherein the infrastructure configuration details are selected from the group consisting of: whether a current virtual machine has dedicated central processing unit (CPU) allocated, whether the current virtual machine has shared CPU allocated, an amount of memory allocation, an amount of CPU allocation, and a number of processors dedicated to the current virtual machine; and wherein the operational environment details are selected from the group consisting of: a number of processors that are currently running in a predetermined pattern, a number of operations that are currently running in a predetermined pattern, a number of applications that are currently running in a predetermined pattern, and a maintenance level of the operational environment.

14. The computer program product of claim 10, the program instructions readable and/or executable by the computer to cause the computer to: cause the predetermined collection of test cases and the test cases created based on the first pattern information to be used for training a predetermined learning model; and use the trained predetermined learning model for performing a second operational run cycle of the application.

15. The computer program product of claim 10, wherein applying the application details associated with a first timestamp interval to the predetermined weightage algorithm includes calculating a first coverage weight, wherein the first coverage weight is based on the predetermined collection of test cases and the application details.

16. The computer program product of claim 15, the program instructions readable and/or executable by the computer to cause the computer to: compare the first coverage weight to a second coverage weight, wherein the second coverage weight is based on the predetermined collection of test cases and is not based on the application details; and determine that test coverage gaps exist in the predetermined collection of test cases in response to a determination that results of the comparison reveal that the first coverage weight is greater than the second coverage weight.

17. The computer program product of claim 15, wherein the predetermined weightage algorithm incorporates a plurality of different predetermined factors selected from the group consisting of: application runtime performance requirements, application runtime reliability requirements, application scalability requirements, application availability requirements, and application runtime security requirements.

18. The computer program product of claim 10, wherein an automated script is used for causing the test cases to be created.

19. A system, comprising:
a processor; and
logic integrated with the processor, executable by the processor, or integrated with and executable by the processor, the logic being configured to:
in response to a determination, from results of analyzing runtime information associated with an application failure event and/or sub-par runtime performance that occurs during a first operational run cycle of an application, that the failure event and/or sub-par runtime performance is caused by a Non-Functional Requirement (NFR) issue, analyze application details associated with a plurality of different timestamp intervals;
in response to a determination that a first of the timestamp intervals falls within a predetermined timestamp associated with the application failure event and/or sub-par runtime performance, collect first pattern information about the application details associated with the first timestamp interval;
apply the first pattern information to a predetermined weightage algorithm; and
in response to a determination, based on an output of the predetermined weightage algorithm, that test coverage gaps exist in a predetermined collection of test cases, cause test cases to be created based on the first pattern information for mitigating the NFR issue during a subsequent operational run cycle of the application.

20. The system of claim 19, wherein the first pattern information is collected using techniques selected from the group consisting of: static code analysis, analysis of an underlying infrastructure configuration provided to a DevOps environment that the first operational run cycle is run in, and analysis of dynamic run time data from the DevOps environment.

* * * * *